United States Patent Office 3,132,375
Patented May 12, 1964

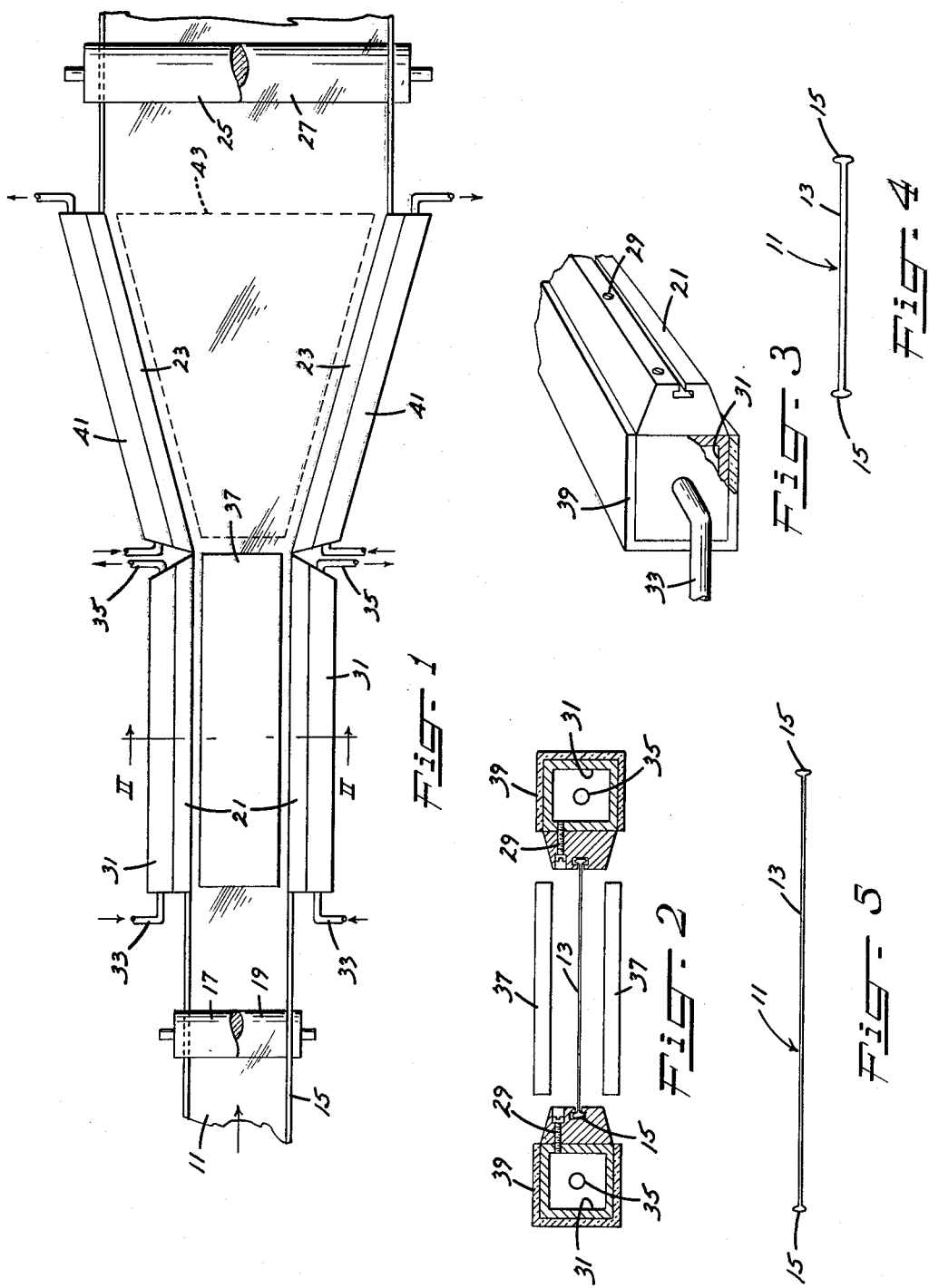

3,132,375
METHOD AND APPARATUS FOR STRETCHING BEADED-EDGE FILMS
Hugo Paul Koppehele, Glen Riddle, Pa., assignor, by mesne assignments, to FMC Corporation, San Jose, Calif., a corporation of Delaware
Filed Dec. 24, 1959, Ser. No. 861,797
6 Claims. (Cl. 18—1)

The present invention relates to the manufacture of plastic films or sheets and particularly to a method and apparatus for stretching of crystalline polymeric materials to improve the properties thereof.

In the conventional manufacture of films from polymeric materials, as for example from polyethylene and polypropylene polymers, the molten polymer is extruded as a continuous sheet and is then rapidly quenched, as for example by a cooling liquid or gas. To convert this film to a more useful article, the film must be oriented by stretching preferably in two mutually perpendicular or biaxial directions to form a substantially balanced film in which the physical properties, such as tensile strength, elongation, etc., are substantially the same as measured in both directions.

To facilitate longitudinal and transverse stretching of a continuous film, a conventional practice is to initially form the film with thickened or beaded longitudinal edges which are adapted to slidably engage with stationary metal tracks. The tracks serve to restrain the film beads against transverse movement as the film is drawn and conveyed in a longitudinal direction and are disposed in diverging relationship when a simultaneous biaxial stretching of the film is desired. Generally, the film is heated during the actual stretching operation, and in some known procedures may also be preheated just prior to the stretching stage. In stretching of polymeric films, and particularly films formed of polypropylene, in accordance with these known procedures, it was found that the film beads had undergone considerable biaxial orientation. Thus, it was necessary that the initial films have relatively large beads to insure retention of the film by the track members, while compensating for the polymer flow during the biaxial orientation thereof. More important, the film web was found to be stretched only in a machine direction; that is, along its longitudinal axis so that the resulting film was of non-uniform gauge along its width. Accordingly a primary object of this invention is to provide an improved and more satisfactory stretching process for biaxially orienting thermoplastic polymeric films.

Another object is the provision of an improved biaxial stretching process for beaded-edge polymeric thermoplastic films, and particularly films formed of polypropylene.

A further object is to provide a biaxial stretching process for producing oriented beaded-edge films having webs of substantially uniform gauge along their entire width.

Another object of the invention is to provide a method and apparatus for stretching beaded-edge thermoplastic polymeric films wherein a temperature differential is maintained between the film web and beads to achieve a uniform and controlled molecular orientation along transverse and longitudinal film directions.

These and other objects and advantages of the invention will be apparent from the following description and accompanying drawing in which:

FIGURE 1 is a plan view of the apparatus of the present invention;

FIGURE 2 is a transverse vertical section taken along the line II, II of FIGURE 1;

FIGURE 3 is a perspective view of a portion of the apparatus shown in FIGURE 1;

FIGURE 4 is a transverse vertical section through a conventional beaded edge polymeric film prior to being stretched; and FIGURE 5 is a transverse vertical section through a conventional beaded edge film after being biaxially stretched in accordance with the present invention.

In general, the objects of the present invention are achieved by preheating of a thermoplastic, polymeric, beaded-edge film so that the film web is at a higher temperature than the film beads as the film is subjected to biaxial stretching forces. More specifically, the beaded edges of the film are heated to a temperature below or up to the softening range of the polymeric material from which the film is formed. The film web, on the other hand, is independently heated to a temperature higher than that of the film beads, and preferably within the softening range but less than the temperature at which the polymeric material is molten. While both the film web and beads are at elevated temperatures during the biaxial stretching operation, the relatively cool film beads are drawn or stretched only in a longitudinal direction. The film web, being at a higher temperature and thus having a lower modulus, requires a lower drawing force and is therefore stretched in both longitudinal and transverse or biaxial directions. During the stretching operation, heat may be applied to or subtracted from portions of the film to maintain a desired temperature differential between the film web and beads.

The apparatus for practicing the method of the present invention includes rolls for feeding the unstretched film to a pair of spaced tracks which are designed to enclose the film beads and slidably direct the same along substantially parallel paths, means for receiving the film as it leaves the tracks and guide its beaded edges along divergent paths, draw rolls for longitudinally advancing and stretching the film, and means for independently preheating the film web and beads to different degrees prior to stretching of the same. The divergent relation of the bead guide means will induce transverse stretching forces in the film, which are confined to the film web in view of temperature differential between the film web and beads.

The present invention resides in the discovery that biaxially stretching of a polymeric film which has been selectively preheated to elevate the film web to a temperature higher than that of the film beads facilitates longitudinal orientation of the polymer molecules in both the film web and beads, yet confines transverse orientation to the film web itself. In effect, the temperature differential between the film web and beads assures that only the hotter and thus more yieldable material of the film web will readily respond to the transverse stretching forces. Preheating of the film is essential to the satisfactory practice of the method of the present invention and can be so regulated as to compensate for the heat variations normally encountered during a film stretching operation. As a result, substantially complete control over the temperature differential between the film web and beads is provided, thus facilitating the production of a uniform biaxially oriented film having balanced properties.

With reference to the drawing for a more detailed description of the invention the film to be stretched, indicated at 11, is of conventional configuration having a web 13 of substantially uniform thickness and enlarged or beaded longitudinal edges 15. A pair of feed rolls 17 and 19 are employed for delivering the film 11 to a pair of laterally spaced, substantially parallel tracks 21 which are adapted to slidably engage with the film beaded edges 15. The film 11 is advanced relative to the tracks 21 and between a pair of guides 23 by take-up rolls 25 and 27 which are driven at a speed greater than that of the feed rolls 17 and 19 to induce a longitudinal stretching of the film.

The tracks 21 are secured by bolts 29 to elongated closed ducts 31 through which a heated medium may be circulated as by pipes 33 and 35. Both the tracks 21 and the ducts 31 are formed of metal or other suitable material which will readily conduct heat to the film beaded edges 15 from the heated medium circulating through the duct 31. Radiant panels 37, or other suitable means such as steam panels, etc., are adjustably mounted along one or both sides of the path traversed by the film as it is advanced relative to the tracks 21 for heating the film web 13 independently of the film bead heating means. To shield the beaded edges of the film from the heat radiated by the panels 37, and thus afford better control over the temperature of the film beaded edges, the outer surfaces of the ducts 31, and if necessary, the tracks 21 are covered with a heat insulative material 39.

As the heated film leaves the tracks 21 its beaded edges 15 are slidably engaged by the guides 23 which are disposed in divergent relationship for effecting a gradual stretching of the heated film web in a transverse direction concomitantly with its longitudinal advancement. The guides 23 may include endless conveyors, such as disclosed in my copending application Serial No. 852,578, filed November 12, 1959, now Patent No. 3,055,048, and entitled Simultaneous Biaxial Stretching of Film With a Tenter Frame, or may be of any known arrangement which is designed to slidably guide the beaded edges of the film along divergent paths. As illustrated, the guides 23 may be of a construction similar to the tracks 21, and may also include ducts 41, which correspond to the ducts 31 heretofore described, through which either a heating or cooling medium may be circulated to maintain the film beaded edges at a uniform temperature throughout the stretching stage. Likewise, radiant panels or other suitable heating means 43, indicated in broken lines in FIGURE 1, may be disposed along one or both sides of the film path to maintain the film web at a uniform temperature throughout the stretching process.

In practicing the method of the present invention with the above described apparatus, the film 11 is passed between the feed rolls 17 and 19 after which its beaded edges 15 are slidably engaged with the tracks 21. A heated fluid, either a gas or liquid, is circulated through the ducts 31 and the radiant panels 37 are rendered operative and adjusted into desired positions adjacent to the film path. As the heated film leaves the tracks 21 its beaded edges 15 are slidably engaged with the guides 23 and then advanced in-between the draw rolls 25 and 27.

The fluid medium circulated through the ducts 31 is designed to heat the film beaded edges 15 to a temperature below or up to the softening range of the polymeric material from which the film 11 is formed and thus its temperature will depend upon such factors as the particular polymeric material employed, the speed of film travel, the rate of heat transfer to the tracks 21, etc. The radiant panels 37, on the other hand, serve to heat the film web 13 to a temperature above that of the beads and preferably within the softening range of the polymeric material but below the temperature at which the polymeric material is molten so that the surface temperature of the panels 37 will also be varied with the particular polymeric material, the rate of film travel, etc. It will of course be understood that during the initial lacing of the film through the apparatus, the temperature of the radiant panels 37 are so adjusted as to avoid overheating of the film.

With the apparatus laced as shown in FIGURE 1, the feed and draw rolls are set into operation to deliver and advance the film into and through the preheating and stretching zones of the apparatus. The draw rolls 25 and 27 are driven at a speed greater than that of the feed rolls 17 and 19 so as to stretch both the heated web and beads of the film longtiudinally to substantially the same degree as the film is advanced along the guides 23. Concomitantly with this longitudinal advancement and stretching of the film, the film beads 15 are directed along divergent paths by the guides 23 to thereby induce a transverse stretching of the film web 13. As heretofore mentioned, the film web is heated to a temperature higher than that of the film beads, and preferably to within the softening range of the polymeric material from which the film 11 is formed, and thus will more readily respond to the transverse stretching forces. Thus, in view of the temperature differential maintained between the film web and beads, all of the transverse stretching of the film will be confined to the film web itself. The stretched film is cooled as it passes between the draw rolls 25 and 27 and is collected by suitable means, not shown.

In general, the stretching phase of the described method is of relatively short duration, usually of less than ten seconds, so that the temperature differential between the film beads and web remains substantially uniform throughout the entire stretching operation. The heat generated during the orientation of the polymer molecules will at least in part compensate for any heat losses and, if desired, the stretching apparatus may be enclosed within a chamber or like structure to avoid undesired film cooling. In cases where an unusually long stretching zone is employed or the film is advanced at a relatively slow rate, it may be desirable to heat the film during the stretching operation, as by radiant panels 43. Fluids may be circulated through the ducts 41 to apply heat to the film beads to compensate for thermal losses or, alternatively, to extract excess heat which may develop as a result of friction between the film bead and guide surfaces.

In view of the controlled biaxial stretching of the film, and especially the transverse stretching of the film web 13, the resulting stretched film is of substantially uniform gauge along its entire width, as shown in FIGURE 5, and possesses balance properties. As is apparent from the above description, the method and apparatus of the present invention facilitate uniform biaxial orientation of polymeric film rapidly and on a continuous basis.

While preferred embodiments of the invention have been shown and described, it is to be understood that changes and variations may be made without departing from the spirit and scope of the invention as defined in the appended claims.

I claim:

1. A method for biaxially orienting a continuous thermoplastic, polymeric film having a web and beaded longitudinal edges comprising continuously delivering the film into and through a heating zone with its longitudinal edges in substantially parallel relationship, heating the beaded edges of the film to a temperature not greater than the softening temperature of the polymeric material as the film is passed through the heating zone, concomitantly heating the film web to a temperature greater than that of the film beaded edges and below the temperature at which the polymeric material is molten, continuously advancing the heated film away from the heating zone at a speed greater than the speed of the film delivery to stretch the film in a longitudinal direction, and directing the heated beaded edges of the film along divergent paths as the film is advanced away from the heating zone to stretch the heated film web transversely.

2. A method as defined in claim 1 further including the step of heating at least the film web as the film is advanced away from the heating zone to maintain a uniform temperature differential between the film web and beaded edges during the stretching thereof.

3. A method as defined in claim 1 wherein the film beaded edges and web are independently heated within the heating zone.

4. A method for biaxially orienting a continuous thermoplastic polymeric film having a web and beaded longitudinal edges comprising slidably and continuously engaging the beaded edges of the film, continuously delivering the film into and through a film heating zone with the film beaded edges in substantially parallel relationship, heating the beaded edges of the film to a temperature not greater than the softening temperature of the polymeric material as the film is passed through the heating zone, concomitantly heating the film web to a temperature greater than that of the film beaded edges and below the temperature at which the polymeric material is molten, advancing the film away from the heating zone at a speed greater than the speed of film delivery to stretch the heated film longitudinally, and continuously engaging and slidably guiding the heated beaded edges of the film along divergent paths as the film is advanced away from the heating zone to stretch the heated film web transversely simultaneously with the longitudinal stretching thereof.

5. A method as defined in claim 4 wherein the thermoplastic polymeric film is formed of polypropylene.

6. Apparatus for biaxially orienting a thermoplastic polymeric film having a web and beaded longitudinal edges including a pair of laterally spaced tracks disposed in substantially parallel relationship and adapted to slidably engage with the beaded edges of the film, means for delivering the film in-between said tracks, an elongated duct connected to each of said tracks in heat-conducting relationship and extending substantially coextensively therewith, means for circulating a heated fluid through said ducts for heating the beaded edges of the film, radiant heat panels positioned between said tracks and adjacent to the path of the film for heating the film web, means for insulating the beaded edges of the film from the heat supplied by said radiant panels, means positioned to engage with and guide the film beaded edges as the film leaves said tracks, means operative at a speed greater than said film delivery means for advancing the film along said guide means and longitudinally stretching the same, said guide means being disposed along divergent paths to induce transverse stretching of the film web concomitantly with the longitudinal stretching thereof, and means for regulating the temperature of the film web and beaded edges during the stretching thereof to maintain a uniform temperature differential therebetween.

References Cited in the file of this patent

UNITED STATES PATENTS

| | | |
|---|---|---|
| 2,297,645 | Bailey | Sept. 29, 1942 |
| 2,342,891 | Powers | Feb. 29, 1944 |
| 2,412,187 | Wiley et al. | Dec. 3, 1946 |
| 2,728,941 | Alles et al. | Jan. 3, 1956 |
| 2,841,820 | Pfeiffer | July 8, 1958 |